US006546725B2

(12) United States Patent
Hu et al.

(10) Patent No.: US 6,546,725 B2
(45) Date of Patent: Apr. 15, 2003

(54) HYDRAULIC JACK AND A HYDRAULIC CIRCUIT FOR SUCH A HYDRAULIC JACK

(75) Inventors: Xuanzhe Hu, Three Eight Town Industrial Exploration Zone, Tai Di Road, Tai Shun, Guangdong Province (CN); Aiwu Hu, Guangdong (CN); Zhenhua Hu, Guangdong (CN)

(73) Assignees: Rongium Zhu, Guangdong (CN); Xuanzhe Hu, Guangdong (CH)

( * ) Notice: Subject to any disclaimer, the term of this patent is extended or adjusted under 35 U.S.C. 154(b) by 182 days.

(21) Appl. No.: 09/740,743

(22) Filed: Dec. 19, 2000

(65) Prior Publication Data

US 2002/0074538 A1 Jun. 20, 2002

(51) Int. Cl.[7] .............................................. F16D 31/02
(52) U.S. Cl. .......................................... 60/481; 60/413
(58) Field of Search ........................... 60/477, 481, 413

(56) References Cited

U.S. PATENT DOCUMENTS 3,871,619 A * 3/1975 Simon ......................... 60/481

* cited by examiner

*Primary Examiner*—Edward K. Look
*Assistant Examiner*—Michael Leslie
(74) *Attorney, Agent, or Firm*—Burns, Doane, Swecker & Mathis, L.L.P.

(57) ABSTRACT

A continuously auto lifting and lowering hydraulic jack comprises a base, an oil pump, working oil cylinder, a piston, an oil box, an accumulator, a two-position and two-way valve, a dual-controlling check, a pressure-set check and other checks. The two-position and two-way valve, the dual-controlling check and the pressure-set check are arranged in a straight line; a valve bore is formed in the base to serve as a common valve bore for the two-position and two-way valve, the dual-controlling check and the pressure-set check. Valve members of the two-position and two-way valve, the dual-controlling check and the pressure-set check are disposed sequentially in the valve bore in series; a tappet is positioned between the two-position and two-way valve and the dual-controlling check; and another tappet is positioned between the dual-controlling check and the pressure-set check. Also disclosed is a hydraulic circuit for the hydraulic jack.

9 Claims, 2 Drawing Sheets

HYDRAULIC JACK AND A HYDRAULIC CIRCUIT FOR SUCH A HYDRAULIC JACK

BACKGROUND OF THE INVENTION

1. Field of the Invention

The present invention relates to the field of a hydraulic jack, in particular, to a continuously auto lifting and lowering hydraulic jack, and to a hydraulic circuit for a continuously auto lifting and lowering hydraulic jack.

2. Background Art

In the recent years, auto lifting and lowering hydraulic jacks have greatly been developed. However, there are some defects in the current auto lifting and lowering hydraulic jacks, such as large size, complex structure and high cost in manufacture. Most of the auto lifting and lowering jacks have to be activated by means of an external force during lifting and lowering. The Chinese patent application for invention No. 98112325.2, entitled "All-automatic device and method for a hydraulic jack", discloses a technical solution for transforming a potential energy of a heavy weight into an available kinetic energy so as to achieve all-automatic control. However, the solution fails to solve such a problem that the release of the energy is caused due to operating inadvertently by an operator. And the valve members of the control valves of those hydraulic jacks are required to have a strict position relationship to each other, and therefore the cost of manufacture is relatively high and the structure of a rotatable valve thereof is complex.

SUMMARY OF THE INVENTION

An object of the present invention is to provide a continuously auto lifting and lowering hydraulic jack which can accomplish continuously and automatically lifting and lowering cycles without the help of an external force.

Another object of the present invention is to provide a continuously auto lifting and lowering hydraulic jack which is simple in structure, easy to manufacture and convenient for manipulation.

A further object of the present invention is to provide a hydraulic circuit for a continuously auto lifting and lowering hydraulic jack, in which a hydraulic circuit is simplified by the arrangement of controlling valves to achieve a reliable and convenient control.

To realize the objects described above, the present invention provides a continuously auto lifting and lowering hydraulic jack, which comprises a base, an oil pump, a working oil cylinder, a piston, an oil box, an accumulator, a two-position and two-way valve, a dual-controlling check, a pressure-set check and other checks, wherein the two-position and two-way valve, the dual-controlling check and a pressure-set check are arranged in a straight line; a valve bore is formed in the base to serve as a common valve bore for the two-position and two-way valve, the dual-controlling check and the pressure-set check, with valve members of the two-position and two-way valve, the dual-controlling check and the pressure-set check being disposed sequentially in the valve bore in series; a tappet is positioned between the two-position and two-way valve and the dual-controlling check; and a further tappet is positioned between the dual-controlling check and the pressure-set check.

The present invention further provides a hydraulic circuit for a continuously auto lifting and lowering hydraulic jack, and it comprises an oil pump, a working oil cylinder, a piston, an oil box, an accumulator, a two-position and two-way valve, a dual-controlling check, a pressure-set check and other checks. It further includes a first oil line in which the lower chamber of the working oil cylinder communicates fluidly with the oil box through the two-position and two-way valve; a second oil line in which the oil box communicates fluidly with the lower chamber of the working oil cylinder through a check, a third oil line in which the oil box communicates fluidly with the dual-controlling check through successively one of checks; the oil pump and a further check; and a fourth oil line in which the upper chamber of the working oil cylinder communicates fluidly with the oil box through the pressure-set check and the accumulator; the two-position and two-way valve, the dual-controlling valve and the pressure-set check are connected orderly in series, wherein the dual-controlling check is disposed between the first oil line and the fourth oil line to fluid communicate the two oil lines.

BRIEF DESCRIPTION OF THE DRAWINGS

The objects, structures and features of the present invention can be understood by the description of the preferred embodiment by means of the following drawings, in which.

DESCRIPTION OF ILLUSTRATIVE EMBODIMENTS

Figure 1:
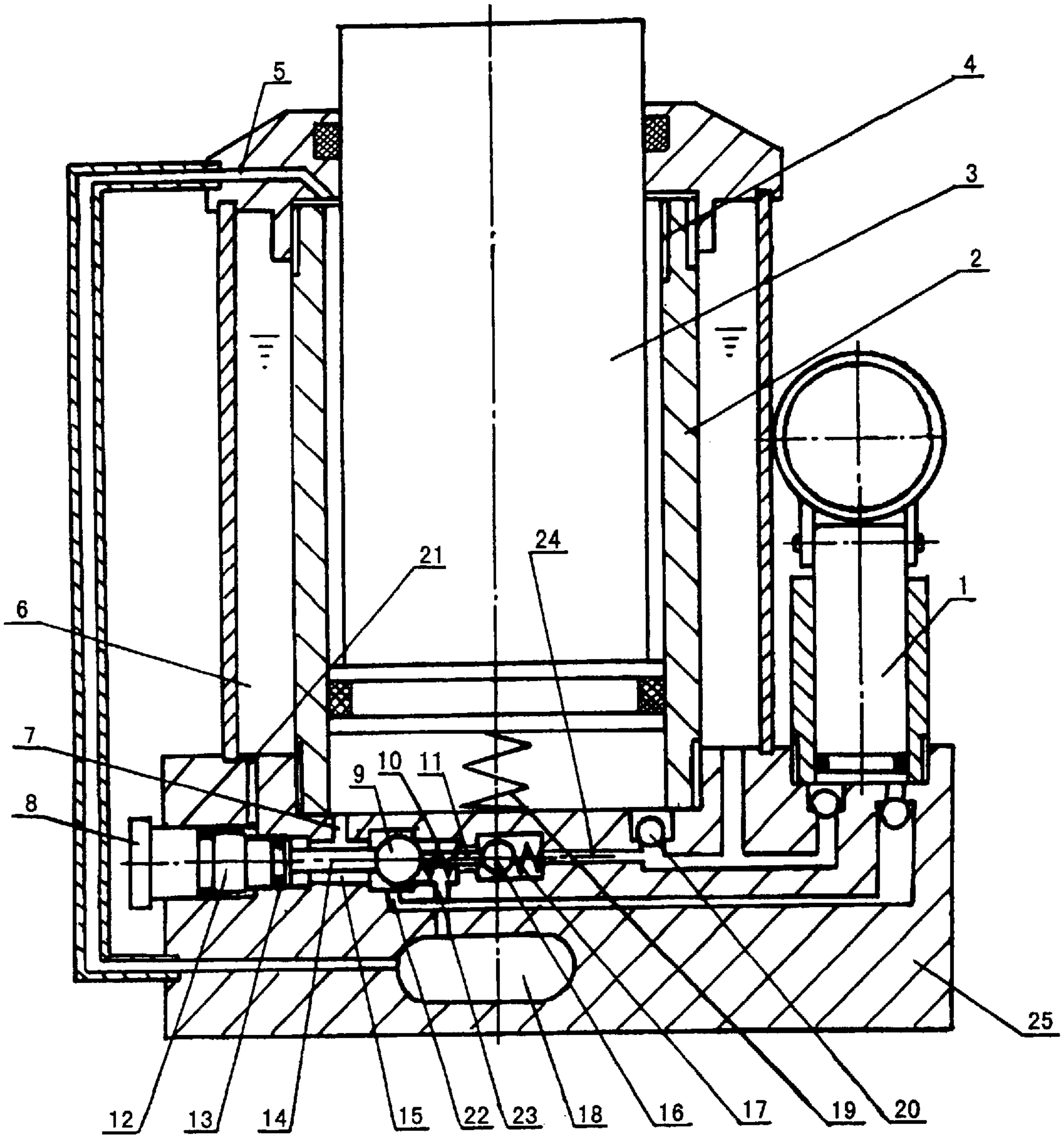
FIG. 1 is a cross-sectional view of the structure of the hydraulic jack of the present invention.

Referring to FIG. 1, the hydraulic jack of the present invention comprises a base 25, an oil pump 1, a working oil cylinder 2, a piston 3, an oil box 6 and an accumulator 18. A rotatable two-position and two-way valve 12, a dual-controlling check 9 and a pressure-set check 16 are disposed in the base 25. Valve members of the rotatable two-position and two-way valve 12, the dual-controlling check 9 and the pressure-set check 16 are positioned in a common valve bore 15 in the base 25. The valve members of the rotatable two-position and two-way valve 12, the dual-controlling check 9 and the pressure-set check 16 are disposed in order from left to right, and are arranged in series. A tappet 14 is positioned between the two-position and two-way valve 12 and the dual-controlling check 9. A further tappet 11 is positioned between the dual-controlling check 9 and the pressure-set check 16, and is telescopically received in a spring 10. One end of the spring 10 bears against an end surface of the dual-controlling check 9, and the other end thereof abuts against the side surface of a step of the valve bore 15. The spring 17 pressing against the pressure-set check 16 is disposed between the valve member of the check and the right end of valve bore 15. There are five channels formed in the valve bore 15, including a first channel 7 being arranged in fluid communication with the lower chamber of the working oil cylinder 2 at the tappet 14 via an oil path; a second channel 21 being arranged in fluid communication with the oil box 6 at two-position and two-way valve 12 via a further oil path; a third channel 22 being arranged in fluid communication with the oil outlet of the oil pump 1 at the dual-controlling check 9 via another oil path; a fourth channel 23 being arranged in fluid communication with the accumulator 18 and the upper chamber of the working oil cylinder 2 at the spring 10 via another oil path; and a fifth channel 24 being arranged in fluid communication with the oil box 6 at the spring 17 via another oil path. A rotatable handle 8 is attached to the rotatable two-position and two-way valve 12 for manipulating the hydraulic jack of the present invention. A highpressure seal ring 13 is arranged at the junction of the rotatable two-position and two-way valve 12 and the tappet 14.

A spring 19 is disposed in the lower chamber of the working oil cylinder. The lower chamber is in fluid communication with the oil box 6 through a check 20 for supplementing hydraulic oil. The upper chamber of the working oil cylinder 2 through an oil path 5 arranged thereabove is in fluid communication with an oil path disposed between the dual-controlling valve 9 and the pressure-set check 16. The oil path 5 is connected to the accumulator 18 in a parallel relationship by means of an oil groove 4 formed in the inner upper surface of the working oil cylinder 2.

Figure 2:
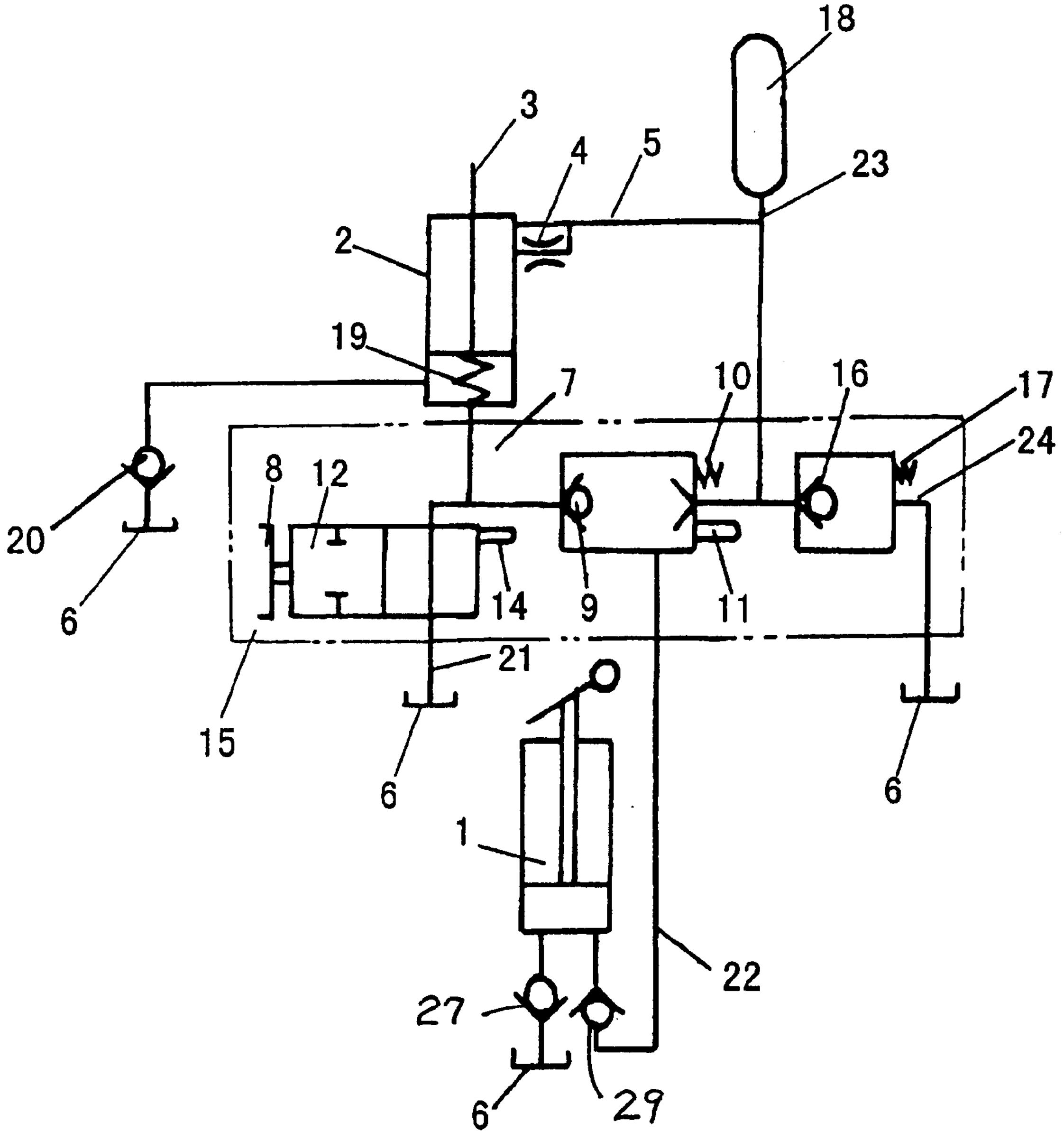
FIG. 2 is a schematic diagram of the hydraulic circuit of the hydraulic jack of the present invention.

Referring to the FIG. 2, a hydraulic circuit for the hydraulic jack according to the present invention is shown. The hydraulic circuit comprises an oil pump 1, a working oil cylinder 2, a piston 3, an oil box 6 and an accumulator 18, a two-position and two-way valve 12, a dual-controlling check 9, a pressure-set check 16 and a plural of other checks. Those members described above are connected to each other through respective oil paths and thus forming a plurality of oil lines. A first oil line is formed from an oil path communicating fluidly the lower chamber of the working oil cylinder 2 with the oil box 6 through the two-position and two-way valve 12, and acts to cause the hydraulic oil in the lower chamber of the working oil cylinder 2 to flow back to the oil box 6 after the work of lifting a weight is accomplished. A second oil line is formed from an oil path communicating fluidly the oil box 6 with the lower chamber of the working oil cylinder 2 through a check 20, and acts to supplement the hydraulic oil to the lower chamber of the working oil cylinder 2 during the course of the free load auto lifting. A third oil line is formed from an oil path communicating fluidly the oil box 6 with the dual-controlling check 9 through successively a second check valve 27, the oil pump 1 and a third check valve 29, and acts to pump the hydraulic oil to the dual-controlling check 9 and further to the lower chamber of the working oil cylinder 2 to lift a weight. A fourth oil line is formed from an oil path communicating fluidly the upper chamber of the working oil cylinder 2 with the oil box 6 through the pressure-set check 16 and the accumulator 18, and acts to discharge the hydraulic oil to the oil box 6 during the course of weight lifting. In addition, the two-position and two-way valve 12, the dual-controlling check 9 and the pressure-set check 16 are connected sequentially and fluidly to one another in series. The dual-controlling valve 9 is disposed between the first oil line and the fourth oil line to communicate fluidly with the two oil lines respectively, so that when the hydraulic jack of the present invention raises continuously and automatically, the hydraulic oil in the upper chamber of the working oil cylinder 2 and the accumulator 18 arranged in the fourth oil line is introduced to the lower chamber of the working oil cylinder 2 arranged in the first oil line through the dual-controlling valve 9, and when the hydraulic jack of the present invention is lifting a weight the hydraulic oil is pumped by the oil pump 1 arranged in the third oil line through the dual-controlling valve 9 to the lower chamber of the working oil cylinder 2 arranged in the first oil line; and while the piston 3 contracts after the work of lifting the weight is done, the dual-controlling valve 9 introduces a portion of the hydraulic oil in the lower chamber of the working oil cylinder 2 arranged in the first oil line into the upper chamber of the working oil cylinder 2 and the accumulator 8 arranged in the fourth oil line.

Referring to FIGS. 1 and 2, the operation of the hydraulic circuit is realized by the steps as follows. When the hydraulic jack of the present invention is in non-operating state the upper chamber of the working oil cylinder 2 retains a portion of the hydraulic oil, and the accumulator 18 stores up certain energy. The lower chamber of the working oil cylinder 2 is in fluid communication with the oil box 6 through the two-position and two-way valve 12 and is maintained at the atmospheric pressure. At the time of beginning the operation of the hydraulic jack of the present invention, at first the two-position and two-way valve 12 is rotated by means of the operation of the handle 8. Subsequently, the valve members and tappets are moved forward together (from left to right). The oil channel disposed between the lower chamber of the working oil cylinder 2 and the oil box 6 is closed by the two-position and two-way valve 12. The dual-controlling check 9 opens its left valve port. The hydraulic oil in the accumulator 18 is introduced to the lower chamber of the working oil cylinder 2 through the left valve port of the dual-controlling check 9. The piston 3 is pushed up under the hydraulic oil pressure and lifted up non-intermittently by means of the elastic force of the spring 19. At the same time the hydraulic oil in the oil box 6 is supplied continuously through the check 20 to the lower chamber of the working oil cylinder 2 until the piston 3 touches the weight to be lifted and is forced to stop lifting. The valve members and tappets continue moving forward. At the time when the dual-controlling valve 9 reaches and closes its right valve port, the tappet 11 pushes away the pressure-set check 16 and the upper chamber of the working oil cylinder 2 is in fluidly communication with the oil box 6. When the weight is to be lifted the hydraulic oil is non-intermittently pumped into the lower chamber of the working oil cylinder 2 through the left valve port of the dual-controlling valve 9, so the weight will be lifted smoothly. As soon as the piston 3 is pushed up to the top of the cylinder by the oil pump 1, an oil groove 4 formed at the upper part of the working oil cylinder 2 and the pressure-set check 16 lead the hydraulic oil in the oil pump 1 back into the oil box 6 so that the extended position of the piston 3 is limited. After the work of lifting the weight is done, the handle 8 is operated again and the two-position and two-way valve is rotated in a reverse direction. Subsequently, valve members and tappets move backward (from right to left) under the action of springs 10 and 17. The pressure-set check 16 is closed and the oil channel from the accumulator 18 and the upper chamber of the working oil cylinder 2 to the oil box 6 is shut. The right valve port of the dual-controlling valve 9 is opened. The hydraulic oil in the lower chamber of the working oil cylinder 2 is forced to flow into the accumulator 18 and the upper chamber of the working oil cylinder 2 through the right valve port of the dual-controlling valve 9 under the action of the weight. The accumulator 18 recovers non-intermittently the energy produced by falling of the weight and stores up the same. Valve members and tappets continue moving. While the valve member of the dual-controlling valve 9 is returning to the left valve port thereof, the hydraulic oil in the lower chamber of the working oil cylinder 2 can still flow through the left valve port thereof due to the action of the weight. Thus the energy is accumulated in the accumulator 18 until the two-position and two-way valve 12 communicates the lower chamber of the working oil cylinder 2 with the oil box 6. As soon as the lower chamber of the working oil cylinder 2 and the oil box 6 get into communication, the small amount of remaining energy produced by the action of the weight is released to the oil box 6 quickly. When the piston 3 contracts substantially in the working oil cylinder 2, the lower chamber of the working oil cylinder 2 remains in a normal pressure state.

The existing unrestored section of the piston rod is pressed back to its initial position by a portion of the energy released from the accumulator 18 to the upper chamber of the working oil cylinder 2, while a large portion of the energy is still retained in the accumulator 18 and the upper chamber of the working oil cylinder 2. Thus, the piston 3 is poised stably in a low position, ready for the next operation of the hydraulic jack.

The structure of the preferred embodiment of the hydraulic jack and a hydraulic circuit for the hydraulic jack of the present invention are disclosed by means of the embodiment above mentioned. However, the contents of the present invention may contain various modifications and variants for the skilled person in the art. Those modifications and variants will fall within the spirit and scope of the present invention.

What is claimed is:

1. A continuously auto lifting and lowering hydraulic jack including a base, an oil pump, a working oil cylinder, a piston, an oil box, an accumulator, a two-position and two-way valve, a dual-controlling check valve, a pressure-set check valve and a plurality of further check valves, further comprising:

said two-position and two-way valve, said dual-controlling check valve and said pressure-set check valve are arranged in a straight line;

a valve bore is formed in said base, to serve as a common valve bore for said two-position and two-way valve, said dual-controlling check valve and said pressure-set check valve;

valve members of said two-position and two-way valve, said dual-controlling check valve and said pressure-set check valve are disposed sequentially in said valve bore in series;

a first tappet is positioned between said two-position and two-way valve and said dual-controlling check valve; and a second tappet is positioned between said dual-controlling check valve and said pressure-set check valve.

2. A continuously auto lifting and lowering hydraulic jack as defined in claim 1, wherein a plurality of channels is arranged in said valve bore, including a first channel being in fluid communication with the lower chamber of said working oil cylinder via an oil path; a second channel being in fluid communication with said oil box via another oil path; a third channel being in fluid communication with an outlet of said oil pump via a further oil path; a fourth channel being in fluid communication with an upper chamber of said working oil cylinder and said accumulator via another further oil path; and a fifth channel being in fluid communication with said oil box via another oil path.

3. A continuously auto lifting and lowering hydraulic jack as defined in claim 2, wherein said second tappet is telescopically received in a spring with one end of said spring bearing against an end surface of said dual-controlling check valve and the other end against a side surface of a step of said valve bore.

4. A continuously auto lifting and lowering hydraulic jack as defined in claim 3, wherein said spring is positioned in said fourth channel.

5. A continuously auto lifting and lowering hydraulic jack as defined in claim 2, wherein said first tappet is positioned in said first channel.

6. A continuously auto lifting and lowering hydraulic jack as defined in claim 2, wherein said two-position and two-way valve is positioned in said second channel.

7. A continuously auto lifting and lowering hydraulic jack as defined in claim 2, wherein said dual-controlling check valve is positioned in said third channel.

8. A continuously auto lifting and lowering hydraulic jack as defined in claim 2, wherein said pressure-set check valve is positioned in said fifth channel.

9. A hydraulic circuit for a continuously auto lifting and lowering hydraulic jack, comprising an oil pump; a working oil cylinder, a piston, an oil box, an accumulator, a two-position and two-way valve, a dual-controlling check valve, a pressure-set check valve and a plurality of further check valves, said hydraulic circuit further including:

a first oil line, in which a lower chamber of said working oil cylinder communicates fluidly with said oil box through said two-position and two-way valve;

a second oil line, in which said oil box communicates fluidly with the lower chamber of said working oil cylinder through a first check valve of said plurality of further check valves;

a third oil line, in which said oil box communicates fluidly with said dual-controlling check valve through successively one of the checks, said oil pump and a third check valve of said plurality of further check values;

a fourth oil line in which an upper chamber of said working oil cylinder communicates fluidly with said oil box through said pressure-set check valve and said accumulator; and said two-position and two-way valve, said dual-controlling check valve and said pressure-set check are connected sequentially and fluidly in series, wherein said dual-controlling check valve is disposed between said first oil line and said fourth line to fluid communicate said two oil lines.

* * * * *